Dec. 9, 1958     SHAFI-UDDIN AHMED CHOUDHURY     2,864,041
OPERATION OF DYNAMO-ELECTRIC MACHINES IN MUTUAL SYNCHRONISM
Filed April 17, 1956
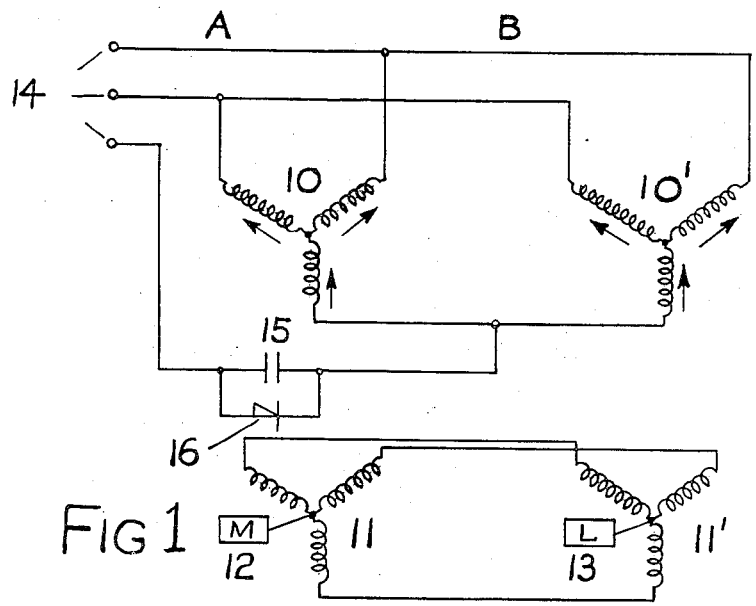
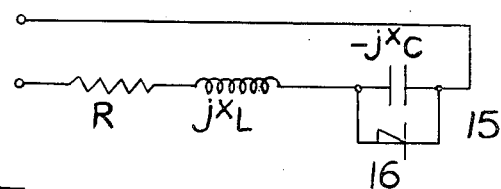
INVENTOR
SHAFI-UDDIN AHMED CHOUDHURY
HIS ATTORNEY United States Patent Office 2,864,041
Patented Dec. 9, 1958

2,864,041

OPERATION OF DYNAMO-ELECTRIC MACHINES IN MUTUAL SYNCHRONISM

Shafi-uddin Ahmed Choudhury, Rugby, England, assignor to The British Thomson-Houston Company Limited, London, England, a British company Application April 17, 1956, Serial No. 578,666

Claims priority, application Great Britain April 21, 1955

3 Claims. (Cl. 318—24)

The present invention relates to the operation in mutual synchronism of dynamo-electric machines of the kind having polyphase secondary windings which, in operation, are interconnected and primary windings which are connected to a common source of supply.

Machines of this type have polyphase windings both on the stator and rotor as are commonly used for two or three phase slipring induction motors and are characterised by the use of either winding for connection to a common electric supply system, these windings constituting the primary windings. The windings which are not connected to electrical supply systems are interconnected with one another and constitute secondary windings. In this way currents in the secondary winding of one machine circulate through the corresponding winding of the other machine or machines and produce a synchronising torque which holds the machines together.

In operation the rotor of one machine, the controlling machine, is rotatable by external means, e. g. by hand or motor, and is generally referred to as the transmitter machine, while the other machine, the controlled machine, follows the movement of the transmitter with an angular lag which is dependent on the torque of the load and may be termed the receiver.

In the majority of cases the transmitter and the receiver are synchronised at standstill, but there are other cases where the transmitter may be continuously driven at any speed while the receiver may have to be stopped and run again, e. g. in machine tool applications the tool carriage for a lathe or boring mill may be driven at low speed for "feed," synchronised to the main drive. The transmitter then is coupled to the main drive while the receiver drives the tool carriage. The same receiver may be run as an induction motor to drive the tool carriage at a high speed for traverse. The problem in this case is to synchronise the stationary receiver to the running transmitter automatically.

Attempts have been made in the past to achieve this by the use of a multiplicity of relays or careful adjustments of circuit impedances to keep the accelerating induction motor torque low and yet enough for acceleration or by eddy current brakes and similar devices.

Furthermore, when the machines are excited from an alternating current source the maximum operating speed is generally not greater than 80% of the synchronous speed as induction motor. This is because the synchronising torque falls rapidly as the machine approaches synchronous speed at which speed it is zero. If the machines are excited from a direct current source, the above limitation of upper speed disappears but the operation is not satisfactory at low speeds down to zero speed.

The object of the invention is to enable the machines to operate from zero speed to super synchronous speed including synchronous speed operation and thereby overcome the short-comings of existing methods.

In a system for maintaining operation in mutual synchronism of dynamo-electric machines of the kind set forth and for synchronising one of the machines with the other or others from standstill, according to the invention, the polyphase primary windings of the machines are excited simultaneously by alternating and direct current, the direct current excitation being derived from the polyphase supply by including in series in one or more of the phase connections to the supply an impedance shunted by a half-wave rectifier.

The impedance, which is preferably capacitive, should have a reactance comparable with the reactances, under short-circuit conditions, of the primary windings of the machines which are to be maintained in mutual synchronism, if the maximum advantage is to be taken of its introduction.

By this arrangement the introduction of the D. C. component is effected in a very simple manner with a minimum of additional equipment.

The invention will now be described with the aid of the accompanying drawings, in which Fig. 1 shows diagrammatically an arrangement in accordance with the invention, and Fig. 2 indicates the equivalent circuit of the system shown in Fig. 1.

Referring firstly to Fig. 1, we have indicated at A and B, dynamo-electric machines of the kind with which the invention is concerned, connected to operate in mutual synchronism, machine A being regarded as the control, or transmitter machine, and B the controlled, or receiver, machine. Common elements on both machines are indicated by the same reference numerals, those applying to machine B being provided with a prime.

Each machine is provided with polyphase primary windings 10, 10', and polyphase secondary windings 11, 11', the secondary windings are mutually inter-connected and it is intended that the secondary windings be located on the rotor of the machine and the primary windings on the stator; these positions may be reversed if desired.

Assuming the secondary windings 11 to be on the rotor of machine A, the rotor is indicated as being driven by a motor 12, the rotor 11' of the receiver machine B being arranged to drive a load 13. The primary windings of the machines are connected to the corresponding phases of a polyphase source of supply, indicated by terminals 14. Two of the phases of the primary windings of each machine are directly connected to corresponding two phases of the supply, while the third phase, according to the invention, is connected to the corresponding phase of the supply through an impedance shown as a condenser 15, having in parallel with it, a halfwave rectifier 16. The effect of the condenser 15 and rectifier 16 is to provide a D. C. component in the primary windings of machines A and B by rectification of alternate half waves of the supply, the direction of the resulting D. C. component being indicated by the arrows shown on the drawing.

A simplified equivalent circuit of the system may be represented by the impedance network shown in Fig. 2, in which R is the resistance of the windings of the machine referred to the primaries; $jX_L$ is the reactance of the windings of the machines referred to the primaries, and $-jX_C$ is the reactance of a condenser introduced according to the invention, and it is assumed for the sake of simplicity that the resistance of the rectifier is zero when conducting, and infinity when not conducting.

Then $R+jX_L$ is the short circuit impedance which will vary with the speed. When the rectifier is conducting the total impedance is $R+jX_L$, which will pass a forward current, say $I_F$, with a constant applied alternating voltage. During the next half cycle the rectifier will not conduct, and the total impedance will be $$R+j(X_L-X_C)$$

which will cause the backward curent, say $I_B$, to flow in the circuit. The vector difference of these two currents provides the necessary direct component of current. It will be evident that from the ratio $$\frac{R+jX_L}{R+j(X_L-X_C)}$$

can be determined the value of the rectified component of current, as a ratio of the normal alternating current, and this ratio can be predetermined by choosing a suitable value of condenser with respect to the short circuit reactance-to-resistance ratio of the machine; additional external impedance may be added if required.

The added impedance may be either resistance or reactance, or a combination of both, and it will be connected in the supply lines feeding the condenser and rectifier, in either or both the transmitter and receiver lines connected to the condenser and rectifier. It will be found that generally an external resistance connected in the receiver circuit alone will suffice to provide satisfactory automatic synchronising, and this position of the resistance is preferred, because connected in the stator circuit of the receiver it reduces the starting and accelerating torque for rotation with the direction of the rotation of the magnetic field, and therefore increases the ratio of synchronising torque to accelerating torque. The manner in which resistance in the stator of the receiver, or in the common secondary circuit, affects the torques in one or other direction of rotation is explained in United States Patent No. 2,141,939.

A further advantage of the invention is that the arrangement has self-regulating properties. In utilising such machines for transmitting power, the starting and accelerating current may be four or six times the full load current, and the full load power factor is higher than the starting power factor. This means that the value of the impedance of the machines on full load is four to six times the value during the accelerating period, and that the resistance is considerably higher than the reactance. Therefore, not only is the alternating current lower but the ratio of D. C. to A. C. is very much smaller. Thus the direct current, which is not required in the synchronised condition, is reduced to a very low value.

This will be illustrated by an hypothetical example as below. The method of analysis is not strictly correct due to the non-sinusoidal waveform of the current, and the time constants of the circuit affecting the increment and decrement of current conducting and non-conducting periods of the rectifier.

Nevertheless the method indicated affords a simple method indicating the approximate ratio of rectified currents during synchronised full load and non-synchronised condition.

Assume that the currents in each half of a cycle are sinusoidal but of different mean value. Suppose $R$, $X_L$ and $X_C$ in Figure 2 are all 10 ohms under starting condition and the voltage is 100 R. M. S.

When the rectifier is not conducting, the impedance is $=10+j10-j10=10$ ohms. Therefore $$\text{mean current}=\frac{100}{10}\times\frac{2\sqrt{2}}{\pi}=9 \text{ amps.}$$

When the rectifier is conducting, the impedance is $=10+j10=10\times\sqrt{2}$ ohms. Therefore $$\text{mean current}=\frac{100}{10\sqrt{2}}\times\frac{2\sqrt{2}}{\pi}=6.37 \text{ amps.}$$

Therefore means rectifier current$=9-6.37=2.63$ amps.

Now assume that the full load current is ¼ of the starting current and the P. F.$=.8$.

The full load current is therefore$=$ $$\frac{100}{10\times\sqrt{2}}\times\frac{1}{4}=1.77 \text{ amps. R. M. S. at .8 P. F.}$$

When the rectifier is conducting, the machine impedance$=\frac{100}{1.77}=56.5$ ohms at .8 P. F.

$$=45.1+j33.9$$

When the rectifier is not conducting, the impedance$=45.1+j33.9-j10=45.1+j23.9$ $$=51 \text{ ohms}$$

Therefore $$\text{mean current}=\frac{100}{51}\times\frac{2\sqrt{2}}{\pi}=1.77$$

When the rectifier is conducting the means current $$=\text{full load current}\times\frac{2\sqrt{2}}{\pi}=\frac{1.77\times 2\sqrt{2}}{\pi}=1.59 \text{ amps.}$$

Therefore mean rectifier current$=1.77-1.59=.18$ amp. Therefore, $$\text{full load mean rectified current}=\frac{.18}{2.63}$$

or only 6.8% of mean rectified current during accelerating condition.

What I claim is:

1. A system for operating in mutual synchronism transmitting and receiving dynamo-electric machines each having polyphase primary and secondary windings on relatively rotatable parts of the machine comprising a source of polyphase voltages, means connecting said source to the primary polyphase windings of said transmitting and receiving machines, means interconnecting the polyphase secondary windings on said transmitting and receiving machines, means for effecting relative rotation of said primary and secondary windings on said transmitting machines, rectifier means included in the connection between one of the phases of said source and the primary windings of said transmitting and receiving machines whereby to introduce into said primary windings a direct component of current derived from said source and impedance means shunting said rectifier means to permit the flow of alternating current from said source into said primary windings.

2. A system for operating in mutual synchronism transmitting and receiving dynamo-electric machines each having polyphase primary and secondary windings on relatively rotatable parts of the machine, comprising a source of polyphase voltages, means connecting said source to the primary polyphase windings of said transmitting and receiving machines, means interconnecting the polyphase secondary windings on said transmitting and receiving machines, means for effecting relative rotation of said primary and secondary windings on said transmitting machine, half-wave rectifier means included in the connection between one of the phases of said source and the primary windings of said transmitting and receiving machines whereby to introduce into said primary windings a direct component of current derived from said source and a capacitor shunting said rectifier means to permit the flow of alternating current from said source into said primary windings.

3. A system for operating in mutual synchronism transmitting and receiving dynamo-electric machines each having polyphase primary and secondary windings on relatively rotatable parts of the machine comprising a source of polyphase voltages, means connecting said source to the primary polyphase windings of said transmitting and receiving machines, means interconnecting the polyphase secondary windings on said transmitting and receiving machines, means for effecting relative rotation of said primary and secondary windings on said transmitting machine, half-wave rectifier means included in the connection between one of the phases of said source and the primary windings of said transmitting and receiving machines, whereby to introduce into said primary windings a direct component of current derived from said source and a capacitor shunting said rectifier means to permit the flow of alternating current from said source into said primary windings, said capacitor having an impedance at the frequency of said source comparable with the impedance of said primary windings under short-circuit conditions.

References Cited in the file of this patent

UNITED STATES PATENTS

| | | |
|---|---|---|
| 2,310,339 | Arndt | Feb. 9, 1943 |

FOREIGN PATENTS

| | | |
|---|---|---|
| 618,338 | Germany | Sept. 7, 1935 |
| 658,965 | Great Britain | Oct. 17, 1951 |